United States Patent
Watanabe et al.

(10) Patent No.: US 8,198,983 B2
(45) Date of Patent: Jun. 12, 2012

(54) SEMICONDUCTOR INTEGRATED CIRCUIT AND NON-CONTACT ELECTRONIC DEVICE USING THE SAME

(75) Inventors: Kazuki Watanabe, Hino (JP); Hisataka Tsunoda, Midori (JP); Tetsuo Funane, Takasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1133 days.

(21) Appl. No.: 11/785,723

(22) Filed: Apr. 19, 2007

(65) Prior Publication Data

US 2007/0249398 A1 Oct. 25, 2007

(30) Foreign Application Priority Data

Apr. 21, 2006 (JP) .................. 2006-117852

(51) Int. Cl.
*H04Q 5/22* (2006.01)
*H02M 7/217* (2006.01)
(52) U.S. Cl. ...................... 340/10.1; 363/127
(58) Field of Classification Search .................. 363/125, 363/126, 127, 147; 235/492, 487; 340/10.1
See application file for complete search history.

(56) References Cited

U.S. PATENT DOCUMENTS

| 6,321,067 B1* | 11/2001 | Suga et al. .................. 455/41.2 |
| 6,487,100 B2 | 11/2002 | Watanabe et al. |
| 2007/0164122 A1* | 7/2007 | Ju ................................. 235/492 |

FOREIGN PATENT DOCUMENTS

| JP | 2001-274339 A | 10/2001 |
| JP | 2002-099887 | 4/2002 |
| JP | 2003-319574 A | 11/2003 |

* cited by examiner

*Primary Examiner* — Ryan Johnson
(74) *Attorney, Agent, or Firm* — Miles & Stockbridge P.C.

(57) ABSTRACT

Depending on the power supplied to the non-contact electronic device, the voltage suppression characteristic of the regulator function mounted in a power supply circuit is changed. When the power supplied to the non-contact electronic device is small, the voltage change amount of the voltage between antenna terminals for the current flowing in the antenna is increased, and when the power supplied to the non-contact electronic device is large, the voltage change amount of the voltage between the antenna terminals for the current flowing in the antenna is decreased. By this means, the current change of the entire consumption current for the current change of the load modulator (transmitting circuit) at the time of the long distance communication is increased.

14 Claims, 15 Drawing Sheets

SEMICONDUCTOR INTEGRATED CIRCUIT AND NON-CONTACT ELECTRONIC DEVICE USING THE SAME

CROSS-REFERENCE TO RELATED APPLICATION

The present application claims priority from Japanese Patent Application No. JP 2006-117852 filed on Apr. 21, 2006, the content of which is hereby incorporated by reference into this application.

TECHNICAL FIELD OF THE INVENTION

The present invention relates to a semiconductor integrated circuit and a non-contact electronic device using the same. More particularly, it relates to a technology effectively applied to non-contact electronic devices such as an IC card and an IC tag and a configuration of a power supply circuit of a semiconductor integrated circuit mounted on the same.

BACKGROUND OF THE INVENTION

According to the studies by the inventors of the present invention, for example, the following technologies are known in non-contact electronic devices such as an IC card, an IC tag, an RFID, and a mobile phone.

A non-contact electronic device comprising semiconductor integrated circuits having functions of CPU and memory in its interior has been spreading in the field of transportation and finance. Though not particularly limited, the non-contact electronic device does not have a power supply such as a battery, and it operates by generating power from electromagnetic waves received by an antenna. The non-contact electronic device receives data sent from an interrogator (inquiry device) by modulating the electromagnetic waves, and then performs a signal processing of the received data by the CPU and the memory. As a result, according to the obtained data, the load between antenna terminals is fluctuated to modulate the electromagnetic waves received by the antenna, and the data is sent to the interrogator.

For the non-contact electronic device described above, there exists a circuit technology in which a highly efficient and stable power supply voltage is generated by combining a rectifier function and a regulator function, thereby achieving the extension of a communication distance (for example, see Japanese Patent Application Laid-Open Publication No. 2001-274339 (Patent Document 1)).

Further, for the achievement of a wider range of communications, there exists a technology in which the power supply circuit disclosed in Patent Document 1 is used so as to protect withstand voltage of the elements constituting the power supply circuit (for example, see Japanese Patent Application Laid-Open Publication No. 2003-319574 (Patent Document 2)).

SUMMARY OF THE INVENTION

Incidentally, according to the study by the inventors of the present invention on the above-described non-contact electronic device, the following facts have been found out.

FIG. 1 shows a current-voltage characteristic outputted into the non-contact electronic device from both side terminals of the antenna when the power supplied in the form of the electromagnetic waves from the interrogator is received by the antenna provided in the non-contact electronic device.

As shown in the current-voltage characteristic W1 of FIG. 1, depending on the current flowing in a load connected between the antenna terminals, the voltage at the antenna terminals is changed. Therefore, the characteristic W1 is equivalent to that of a voltage source of a signal amplitude V0 having an output resistance R0. In other words, an intersecting point between the current-voltage characteristic W1 and the voltage axis (Y axis) of the same is a signal amplitude V0 of the voltage source, and a slope of the current-voltage characteristic is the output resistance R0.

In general, according to a distance between the interrogator and the non-contact electronic device, that is, a so-called communication distance, the signal amplitude V0 and the output resistance R0 of the voltage source in the equivalent circuit are changed. In particular, in the long distance communication, as the communication distance becomes longer, the signal amplitude V0 is decreased and the output resistance R0 is increased.

FIG. 2 shows an equivalent circuit B0 showing the current-voltage characteristic outputted from both side terminals of the antenna of FIG. 1, and a power supply circuit B1 and a load modulator B2 mounted on the non-contact electronic device.

Since the equivalent circuit B0 has the above-described output characteristic, it is composed of the voltage source E0 having a signal amplitude V0 and the output resistor R0 connected in series. The power supply circuit B1 is composed of a rectifier and a smooth, and it has the regulator function. By this means, the signals inputted to the antenna terminals LA and LB are rectified and smoothed, and a power supply voltage VDD obtained at an output terminal OUT is controlled by the regulator function so as not to exceed a predetermined voltage level.

The load modulator B2 for transmitting data from the non-contact electronic device to the interrogator is connected between the antenna terminals LA and LB and a ground terminal, and the load modulator B2 is controlled by a control signal TX. When the load modulator B2 is turned on by the control signal TX, it generates an output current I1, and when it is turned off, no output current flows. In other words, since the load modulator B2 is a circuit having a function to generate a current change I1 by the control signal TX, it is composed of a current source I1 and a switch S1 connected in series. The current change I1 generated by the current source I1 and the switch S1 flows to either of the antenna terminal LA or LB with higher potential through a diode D1 or D2. Although the load modulator B2 is connected between the antenna terminals LA and LB and the ground terminal in this case, it is not meant to be restrictive. For example, it may be connected to the antenna terminal LA only.

FIG. 3 shows one example of the current-voltage characteristic of each terminal voltage in FIG. 2. Here, the power supply circuit disclosed in Patent Document 2 is taken as an example.

The current axis (X axis) represents the current amplitude of a current I2 flowing in the antenna terminal LA, and the voltage axis (Y axis) represents the voltage amplitude at each terminal. W1 denotes a voltage between the antenna terminals when the load modulator B2 is turned off, W2 denotes a voltage between the antenna terminals when the load modulator B2 is turned on, W3 denotes an output voltage of the power supply circuit B1 when the load modulator B2 is turned off, and W4 denotes an output voltage of the power supply circuit B1 when the load modulator B2 is turned on, respectively. Further, W5 and W6 denote examples of the current-voltage characteristic outputted from the both side terminals of the antenna shown in FIG. 1. More specifically, W5 represents the current-voltage characteristic in the short distance communication, and W6 represents the current-voltage characteristic in the long distance communication, respectively. It can be understood that the current-voltage characteristic W6 has a larger degree of the output resistance R0 shown in FIG. 1 and FIG. 2.

The case where, after the power supply voltage VDD of the power supply circuit B1 reaches a predetermined voltage, a slope R1 is given by the output voltage control operation of a regulator circuit incorporated into the power supply circuit B1 is shown here. In practice, in consideration of the element withstand voltage, the voltage amplitude generated in the antenna terminals LA and LB is required to adjust the slope R1 of the output voltage suppression characteristic.

Further, the slope until the power supply voltage VDD reaches a predetermined voltage is decided based on the consumption current of an internal circuit B31 connected between the output voltage terminal of the power supply circuit B1 and the ground terminal.

A waveform of the voltage W2 between the antenna terminals when the load modulator B2 is turned on can be considered to have a characteristic obtained by shifting the waveform of the voltage W1 between the antenna terminals when the load modulator B2 is turned off by the output current I1 of the load modulator B2 in the direction of the current axis (X axis).

Here, since the power supply circuit B1 and the load modulator B2 having the characteristics shown in FIG. 3 are connected to the antenna terminals LA and LB as shown in FIG. 2, intersecting points with the current-voltage characteristics W5 and W6 showing the output characteristic of the antenna become operating points in the respective conditions. Consequently, the intersecting points of the current-voltage characteristics W5 and W6 and the voltage W2 between the antenna terminals show the operating points when the load modulator B2 is turned on, and the intersecting points of the current-voltage characteristics W5 and W6 and the voltage W1 between the antenna terminals show the operating points when the load modulator B2 is turned off, respectively. The difference in current between these two operating points becomes current changes ΔI2a and ΔI2b outputted to the antenna terminals LA and LB by the turning on and off of the load modulator B2.

Accordingly, it is clear that the current change ΔI2a outputted to the antenna terminals LA and LB in the current-voltage characteristic W6 having a large slope is smaller than the current change ΔI2b outputted to the antenna terminals LA and LB in the current-voltage characteristic W5 having a small slope.

This can be described by using a formula. In the circuit of FIG. 2 having the characteristics of FIG. 3, the current change ΔI2 of the current I2 flowing in the antenna terminal LA between the cases where the load modulator B2 is turned on and turned off can be expressed by the formula 1.

$$\Delta I2=(1-R0/(R0+R1))\times I1 \quad \text{(Formula 1)}$$

The formula 1 shows that, since the coefficient of the right side approximates to zero when the output resistance R0 in the equivalent circuit B0 is extremely higher than the slope R1 of the output voltage suppression characteristic shown in FIG. 3, the output current I1 of the load modulator B2 is attenuated, and the current change ΔI2 of the antenna terminal LA becomes small, and this is identical to the relationship between the current changes ΔI2a and ΔI2b shown in FIG. 3.

Here, if the slope R1 of the output voltage suppression characteristic is made larger in comparison with the output resistance R0 in the equivalent circuit B0 described above similarly to Patent Document 1, the current change ΔI2 of the antenna terminal LA can be made larger. However, as described above, since the voltage amplitude generated at the antenna terminals is increased, there is a high possibility that the voltage between the antenna terminals exceeds the element withstand voltage in the short distance communication, and this is not practical.

As described above, in the power supply circuit in which the slope R1 of the output voltage suppression characteristic is small, when the slope of the current-voltage characteristic outputted from both side terminals of the antenna is large, in particular, at the time of the long distance communication between the interrogator and the non-contact electronic device, there has been a problem that the current change at the antenna terminal LA generated by the load modulator B2 becomes extremely small, and the interrogator is unable to receive the data transmitted from the non-contact electronic device.

Hence, an object of the present invention is to provide a circuit technology capable of realizing the stable transmission from the non-contact electronic device to the interrogator even in the case where the communication distance between the non-contact electronic device and the interrogator is long.

The above and other objects and novel characteristics of the present invention will be apparent from the description of this specification and the accompanying drawings.

The typical ones of the inventions disclosed in this application will be briefly described as follows.

That is, the semiconductor integrated circuit and the non-contact electronic device using the same according to the present invention comprise an antenna, a rectifier function, a load modulation function, and a regulator function, and have a voltage-current characteristic that, in the region where the output voltage is suppressed by the regulator function, the change of the voltage generated at both ends of the antenna for the current flowing in the antenna is increased when the power supplied to the non-contact electronic device is small, and the change of the voltage generated at both ends of the antenna for the current flowing in the antenna is decreased when the power supplied to the non-contact electronic device is large.

The effects obtained by typical aspects of the present invention will be briefly described below.

It becomes possible to generate large load modulation current in the data transmission from the non-contact electronic device to the interrogator in the case where the communication distance between the non-contact electronic device and the interrogator is long.

BRIEF DESCRIPTIONS OF THE DRAWINGS

Figure 13:
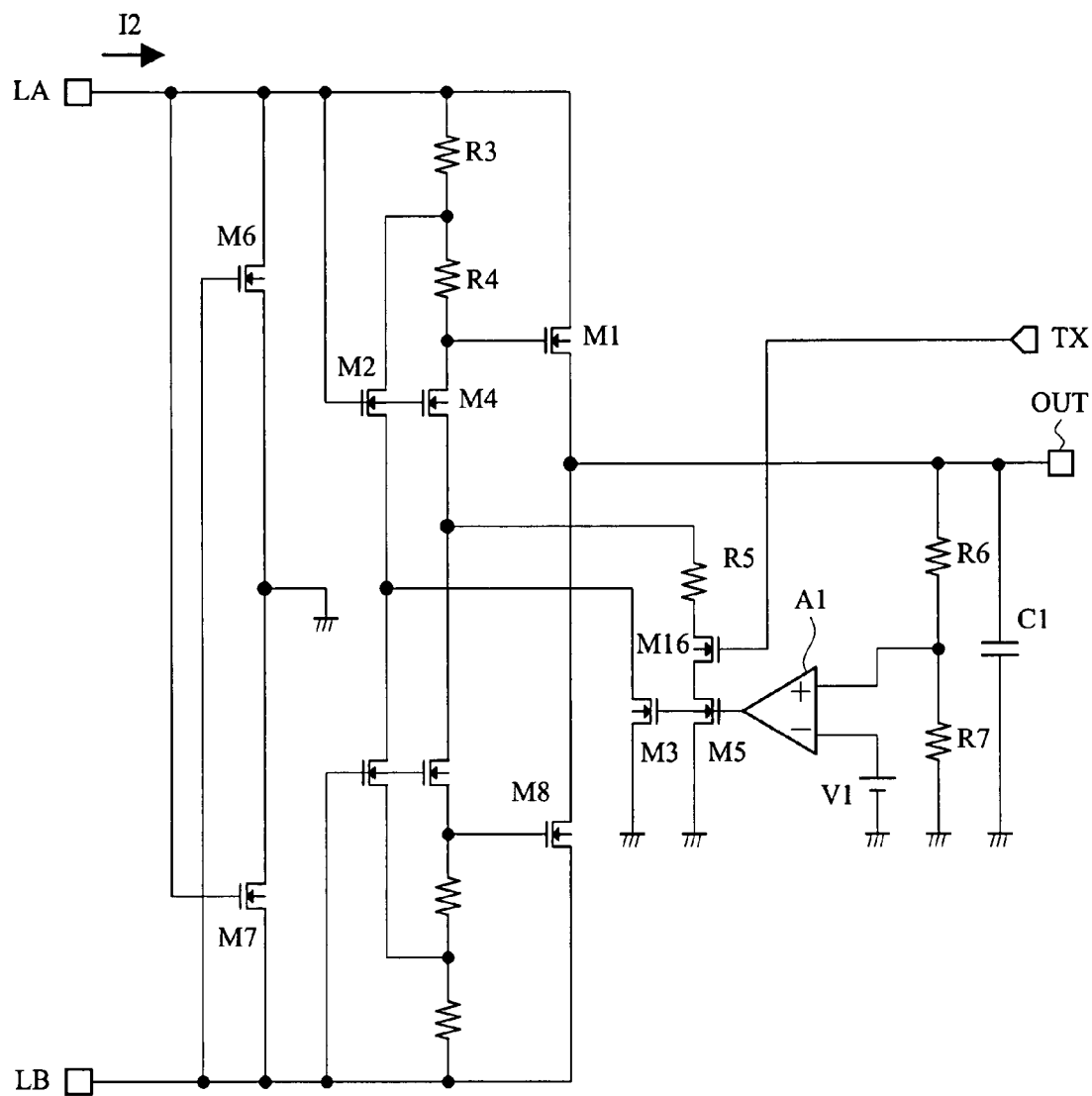
FIG. 13 is a circuit diagram showing the configuration of the power supply circuit mounted on the semiconductor integrated circuit according to a sixth embodiment of the present invention.
Figure 14:
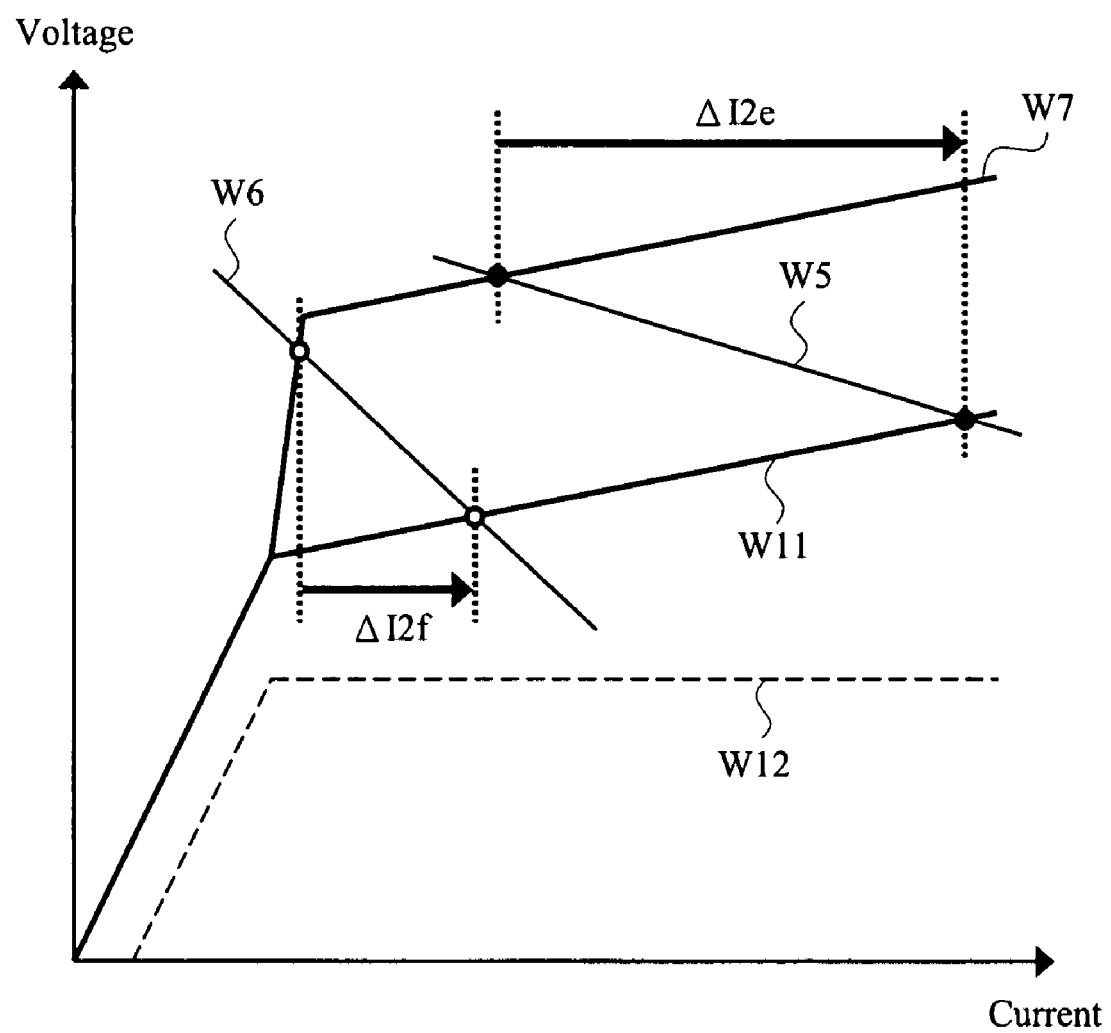
Figure 15:
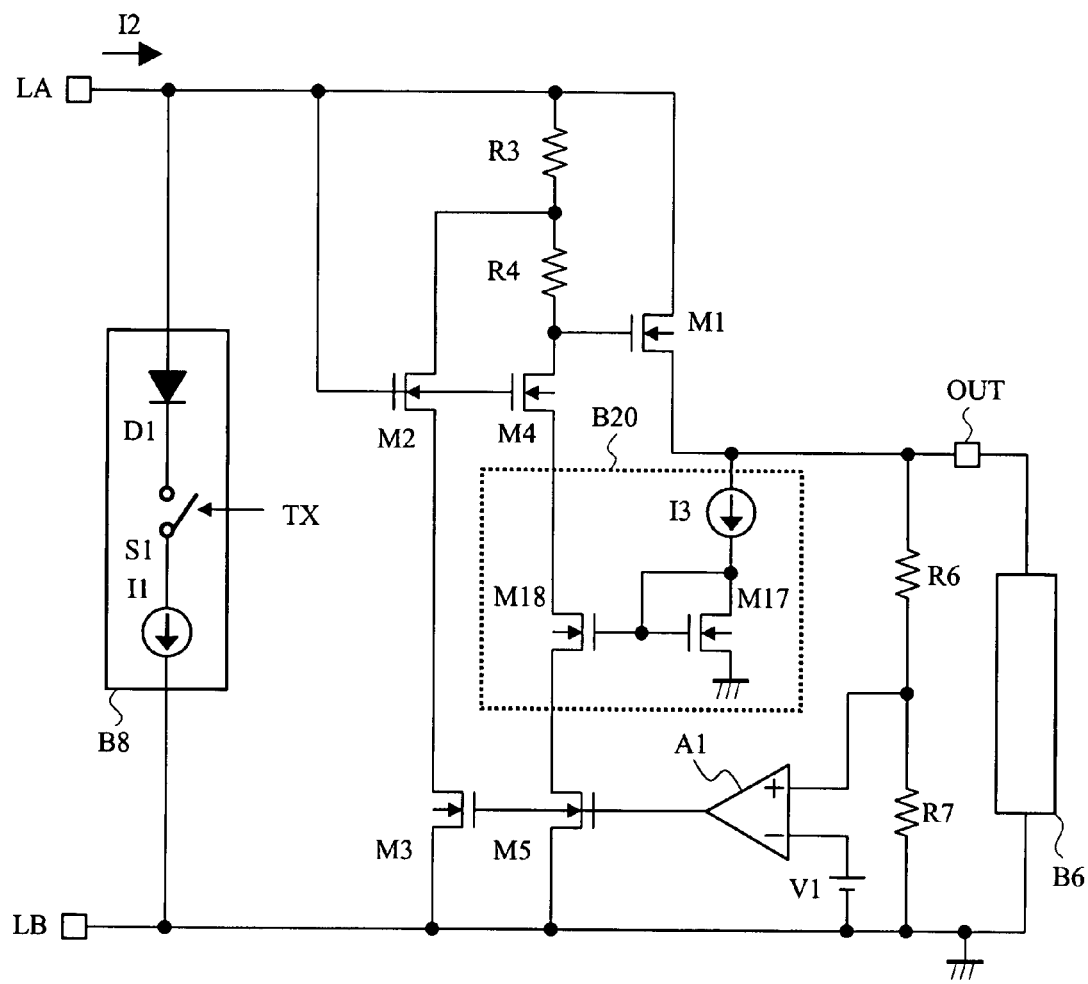

FIG. 14 is a diagram showing the current-voltage characteristic of each terminal voltage when the switch in the power supply circuit having the load modulation function shown in FIG. 13 is turned on and off; and FIG. 15 is a circuit diagram showing the configuration of the power supply circuit mounted on the semiconductor integrated circuit according to a seventh embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 4:
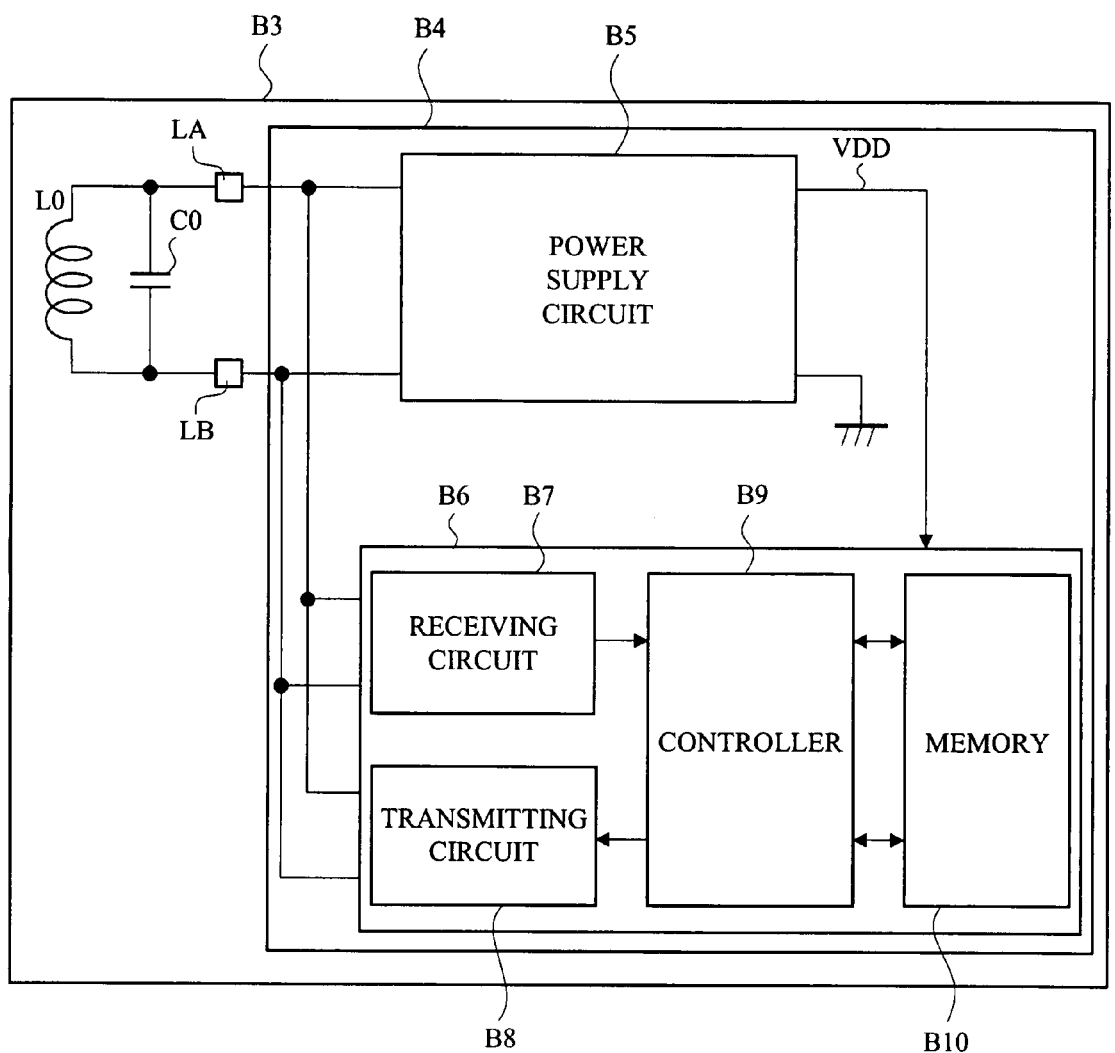
FIG. 4 is a block diagram showing basic configuration of the semiconductor integrated circuit and the non-contact electronic device according to a first embodiment of the present invention.

FIG. 4 is a block diagram showing basic configuration of a semiconductor integrated circuit and a non-contact electronic device according to a first embodiment of the present invention.

First, one example of the configuration of the semiconductor integrated circuit and the non-contact electronic device according to the first embodiment will be described with reference to FIG. 4. The non-contact electronic device of the first embodiment is, for example, an IC card, an IC tag, an RFID, a mobile phone, and others.

In FIG. 4, B3 denotes the non-contact electronic device, B4 denotes the semiconductor integrated circuit mounted on the non-contact electronic device B3, and L0 denotes an antenna mounted on the non-contact electronic device B3. A capacitor C0 connected in parallel with the antenna L0 forms an oscillator. Since this oscillation capacitor C0 is adjusted in consideration of parasitic capacitance and others, it is not necessarily connected. The semiconductor integrated circuit B4 has a power supply circuit B5 and an internal circuit B6, and also has antenna terminals LA and LB for connecting the antenna L0.

In FIG. 4, the power supply circuit B5 is composed of a rectifier, smooth, and a regulator circuit (not shown). The regulator circuit controls the voltage generated by the rectifier and smooth so as not to exceed a predetermined voltage level. The output voltage of the power supply circuit B5 is supplied as a power supply voltage VDD of the internal circuit B6.

The internal circuit B6 is composed of a receiving circuit B7, a transmitting circuit B8, a controller B9, and a memory B10. The receiving circuit B7 demodulates an information signal superposed on an alternate signal received by the antennal L0 provided in the non-contact electronic device B3, and supplies the demodulated signal to the controller B9 as a digital information signal. The transmitting circuit B8 receives the information signal of the digital signal outputted from the controller B9 and modulates the alternate signal received by the antenna L0 by using the information signal. In response to the change of the reflection of the electromagnetic waves from the antenna L0 by the above-described modulation, the interrogator B14 (see FIG. 5) receives the information signal from the controller B9. The memory B10 is used for the recording of the information data and the transmission data demodulated with the controller B9.

Figure 5:
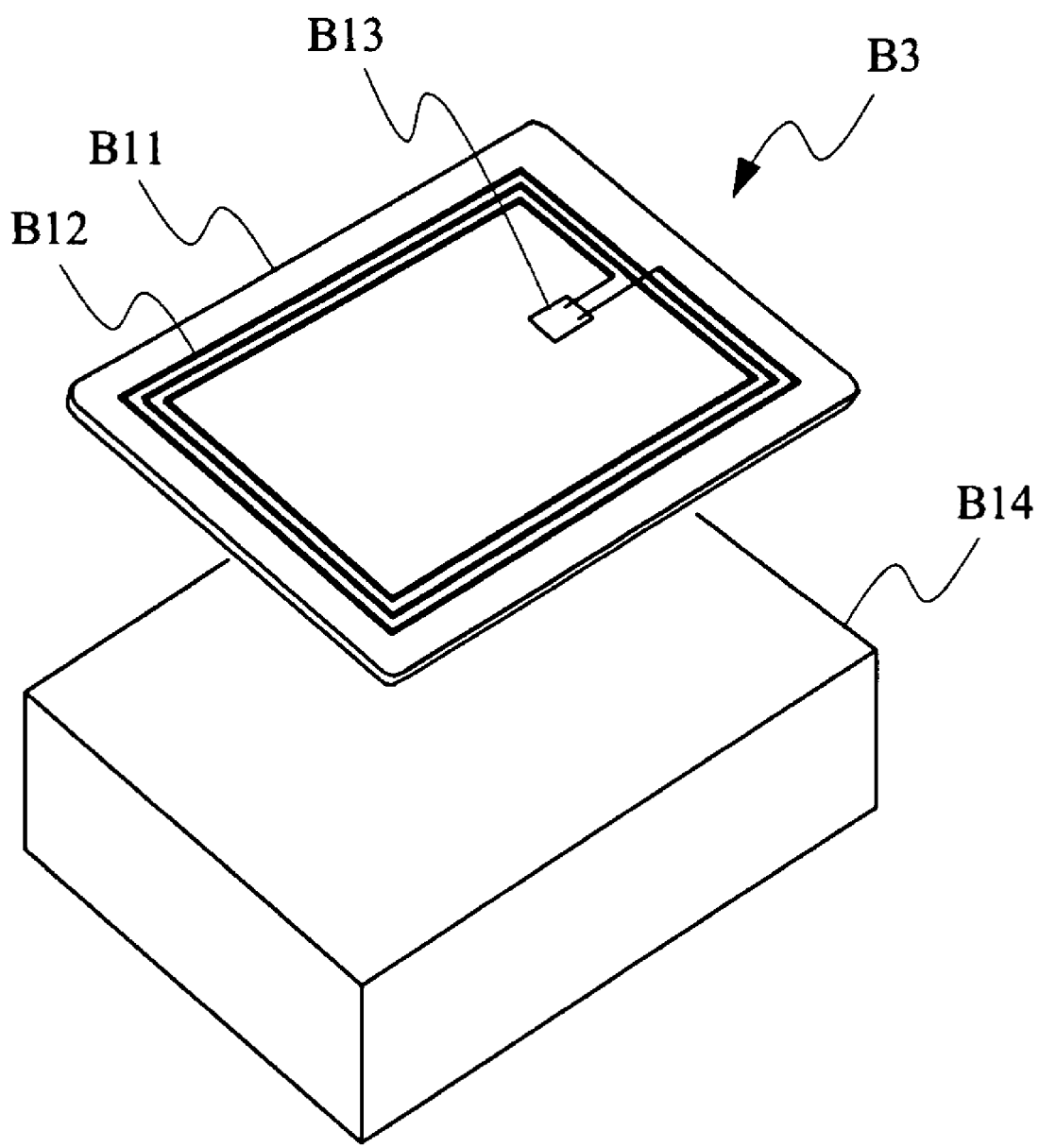
FIG. 5 is a perspective view showing a structure of a circuit board of the non-contact electronic device having the semiconductor integrated circuit and that of an interrogator according to the first embodiment of the present invention.

FIG. 5 shows an example of a structure of the non-contact electronic device B3 and an interrogator B14.

The non-contact electronic device B3 is in a form of, for example, a card with a printed circuit board B11 molded with resin. The antenna L0 which receives the electromagnetic waves from the external interrogator B14 is composed of a spiral coil B12 formed of the wiring of the printed circuit board B11. In the semiconductor integrated circuit B4 composed of one piece of the IC chip B13, the coil B12 to be an antenna is connected to the IC chip B13. When the antenna L0 (coil B12) receives the magnetic waves from the interrogator B14, it outputs high frequency alternate signals to the antenna terminals LA and LB. The alternate signals are partially modulated by the information signals (data).

The present invention is typically applied to the non-contact electronic device having no input and output terminals on its surface. Needless to mention, the present invention may be used for a dual type non-contact electronic device having both of a non-contact interface and input and output terminals. Further, though not particularly limited, the semiconductor integrated circuit B4 is formed on a semiconductor substrate such as single crystal silicon by the publicly known manufacturing technology of the semiconductor integrated circuit.

Figure 6:
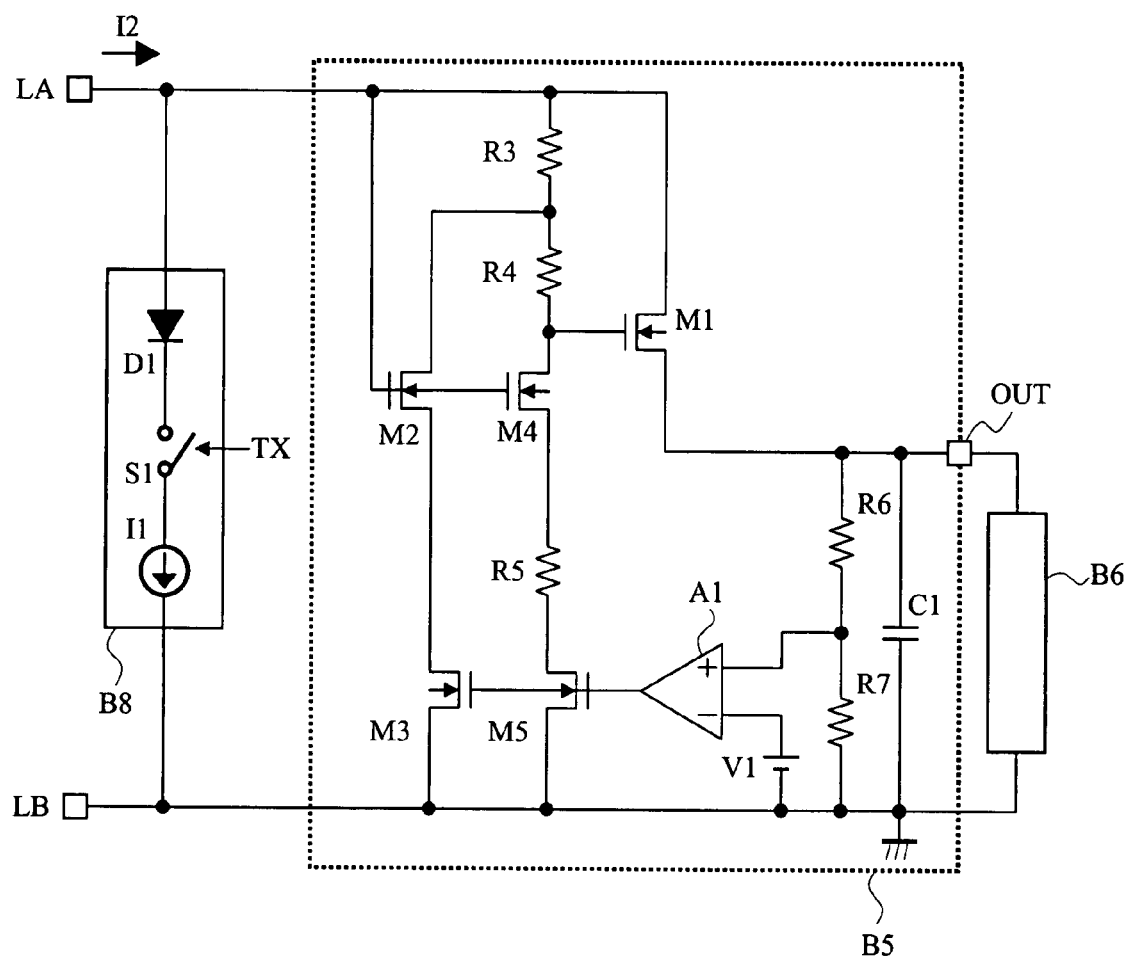
FIG. 6 is a circuit diagram showing the structure of a power supply circuit and a load modulator mounted on the semiconductor integrated circuit according to the first embodiment of the present invention.

FIG. 6 is a circuit diagram showing an example of a basic configuration of the power supply circuit and transmitting circuit (load modulator) mounted on the semiconductor integrated circuit of the first embodiment.

The power supply circuit B5 has a rectifying and smoothing function and an output voltage suppression function, and the antenna L0 mounted in the non-contact electronic device is connected to the antenna terminals LA and LB. In this case, the antenna terminal LB is used also as a ground terminal in the chip.

In the power supply circuit B5, a MOS transistor M1 having resistors R3 and R4 connected in series between the gate and the drain thereof is connected between the antenna terminal LA and an output terminal OUT, and a connecting point of resistors R6 and R7 connected in series between the output terminal OUT and a ground terminal is connected to a non-inverting input terminal (+) of an operation amplifier circuit A1, and a reference voltage V1 is inputted to an inverting input terminal (−). Further, a MOS transistor M2 whose gate is connected to the antenna terminal LA and a MOS transistor M3 whose gate is connected to the output terminal of the operation amplifier circuit A1 are connected in series between a connecting point of the resistors R3 and R4 and the antenna terminal LB, and a MOS transistor M4 whose gate is connected to the antenna terminal LA, a resistor R5, and a MOS transistor M5 whose gate is connected to the output terminal of the operation amplifier circuit A1 are connected in series between the gate of the MOS transistor M1 and the antenna terminal LB.

The MOS transistor M1 operates as a rectifier element which allows the current to flow from the antenna terminal LA to the output terminal OUT when a potential of the antenna terminal LA is higher than a ground potential, and it supplies the current to a power supply capacitor C1 connected between the output terminal out and the ground terminal. The power supply voltage VDD smoothed by the power supply capacitor C1 is supplied to the internal circuit B6.

The transmitting circuit (load modulator) B8 is connected between the antenna terminal LA and the ground terminal and is composed of a diode D1, a switch S1 controlled by a control signal TX, and a current source I1. Further, it changes the current flowing between the antenna terminals LA and LB based on the control signal TX.

Figure 7:
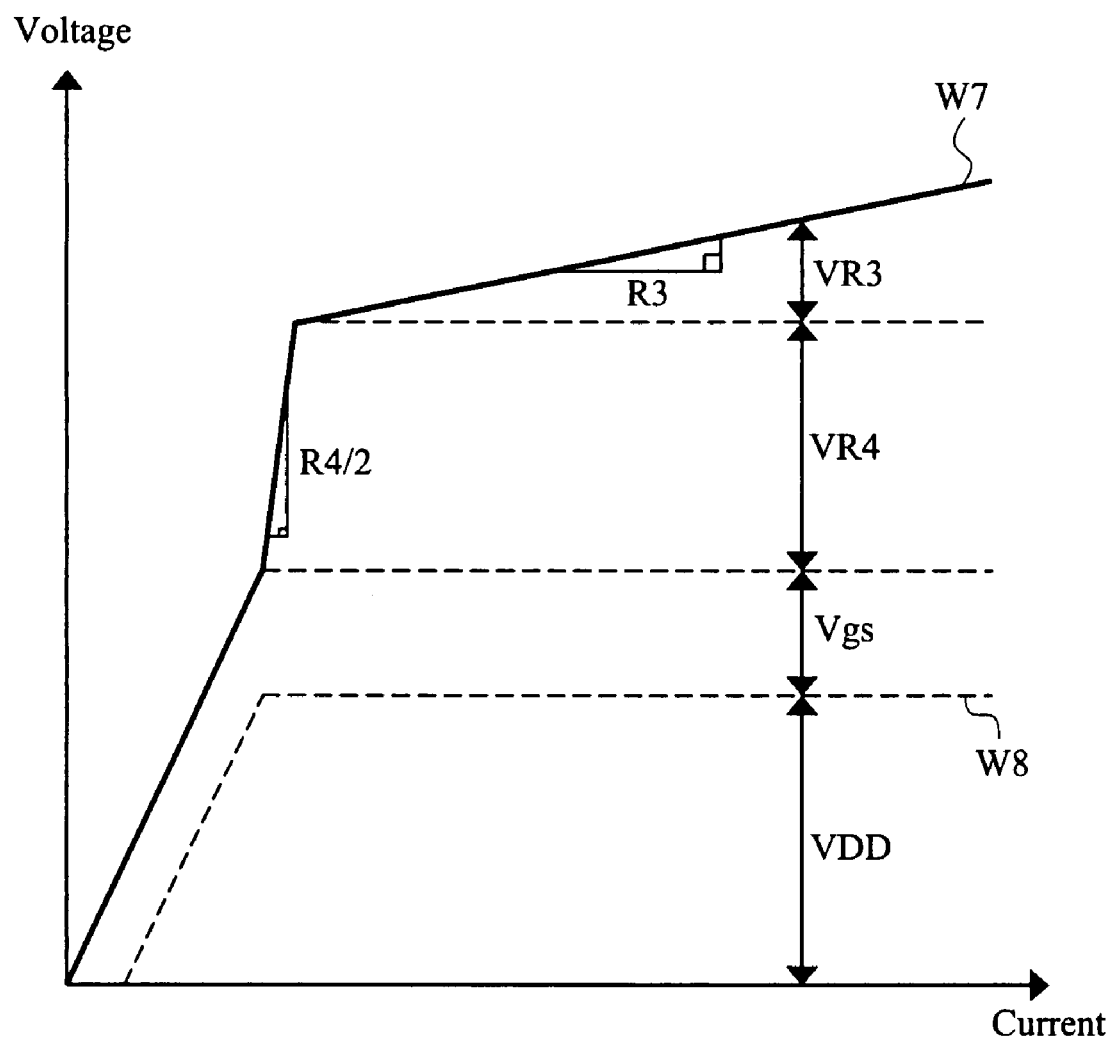
FIG. 7 is a diagram showing the current-voltage characteristic of each terminal voltage in the power supply circuit and the load modulator shown in FIG. 6.

FIG. 7 shows the current-voltage characteristic of each terminal voltage in the power supply circuit and the transmitting circuit (load modulator) shown in FIG. 6.

The current axis (X axis) represents the current amplitude of the current I2 flowing in the antenna terminal LA, and the voltage axis (Y axis) represents the voltage amplitude at each terminal. W7 denotes a voltage between the antenna terminals LA and LB, and W8 denotes a power supply voltage VDD that the power supply circuit B5 outputs from the output terminal OUT.

In FIG. 6, when the power supply voltage VDD is lower than a predetermined level, the current does not flow into the MOS transistors M3 and M5, and therefore, the voltage is not generated at both end terminals of the resistors R3 and R4. Accordingly, since the MOS transistor M1 performs a rectifying operation in a state where the gate and the drain thereof are connected, a voltage lower than that of the antenna terminal LA by the voltage Vgs between the gate and the source of the MOS transistor M1 is outputted to the output terminal OUT. At this time, the current corresponding to the consumption current of the internal circuit B6 flows in the antenna terminals.

When the power supply voltage VDD reaches the predetermined level, the MOS transistors M3 and M5 allow the current corresponding to the power supply voltage VDD to flow. Assuming here that transistor sizes of the MOS transistors M3 and M5 are equal, the currents flowing into the MOS transistors M3 and M4 are equal. Further, assuming that the resistor R4 has an extremely higher resistance value than the resistor R3, the voltage generated between the antenna terminal LA and the gate of the MOS transistor M1 is approximated to the voltage generated at both ends of the resistor R4. By this means, the slope of the voltage W7 between the antenna terminals of FIG. 7 is approximated to the half of the resistor R4. The increase of the voltage at the antenna terminals at this time is approximated to a voltage VR4 generated at both ends of the resistor R4.

Here, since the resistor R5 is connected to the drain of the MOS transistor M5, the current more than a predetermined amount does not flow in the MOS transistor M5. On the other hand, since a resistor is not connected to the drain of the MOS transistor M3, the current flowing in the MOS transistor M3 is not restricted at all, and therefore, after the current of the MOS transistor M5 is saturated, the control is made so that a large current flows to the resistor R3 only. As a result, the slope of the voltage between the antenna terminals of FIG. 7 is approximated to the resistor R3. In other words, after the current of the MOS transistor M5 is saturated, the increase of the antenna terminal voltage becomes equal to a voltage VR3 generated at both ends of the resistor R3.

As described above, it can be understood that the power supply circuit B5 has the configuration characterized in that, immediately after the power supply voltage VDD reaches the predetermined voltage and the voltage suppression operation is started, the change (voltage change slope) of the voltage waveform W7 between the antenna terminals for the current change is large, and when the input current is further increased, the change (voltage change slope) of the voltage waveform W7 between the antenna terminals for the current change becomes small.

Figure 8:
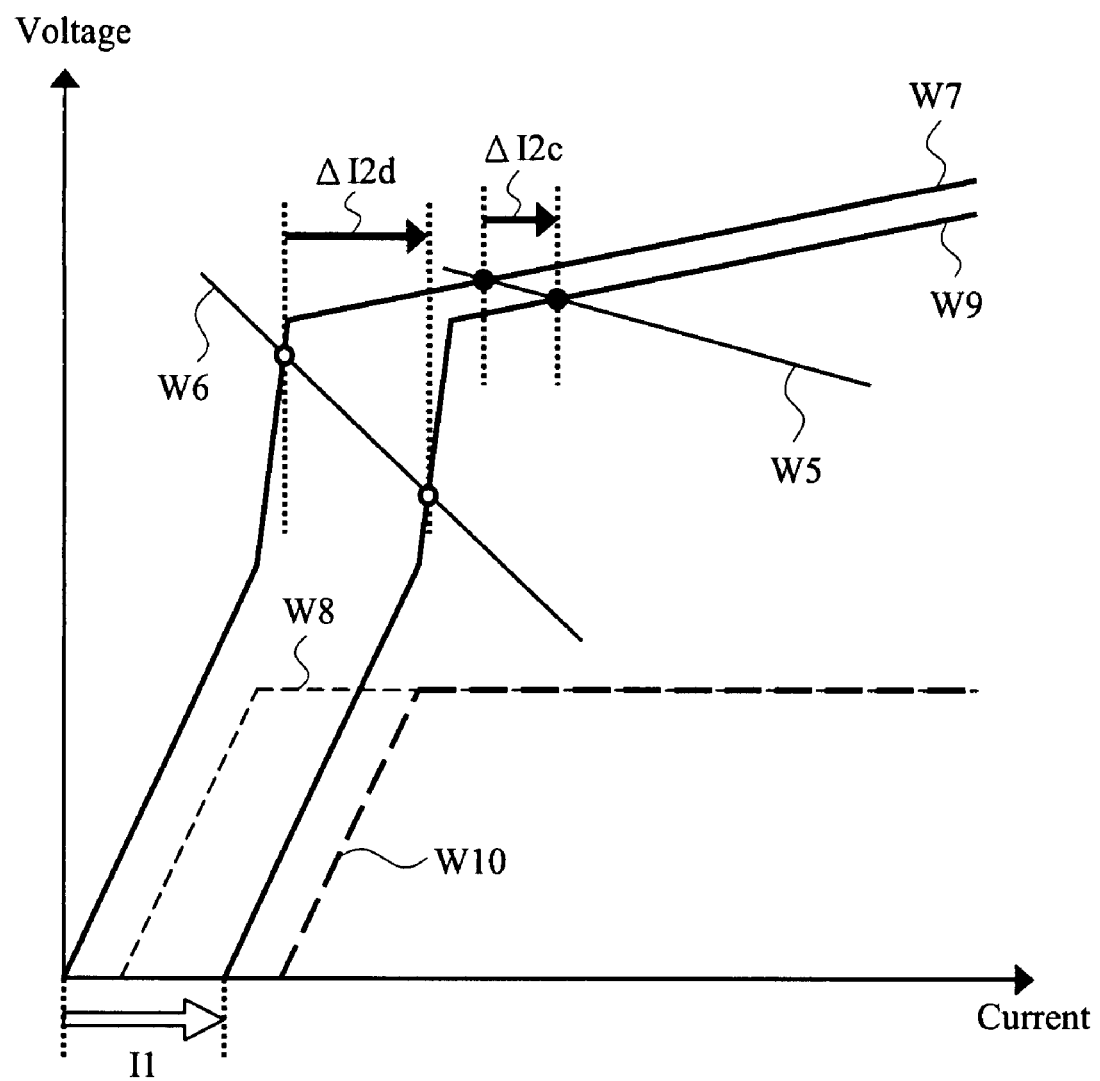
FIG. 8 is a diagram showing the current-voltage characteristic of each terminal voltage when the load modulator is turned on and off in the power supply circuit and the load modulator shown in FIG. 6.

FIG. 8 shows the current-voltage characteristic of each terminal voltage when the transmitting circuit is turned on and off in the power supply circuit and the transmitting circuit (load modulator) shown in FIG. 6.

Figure 1:
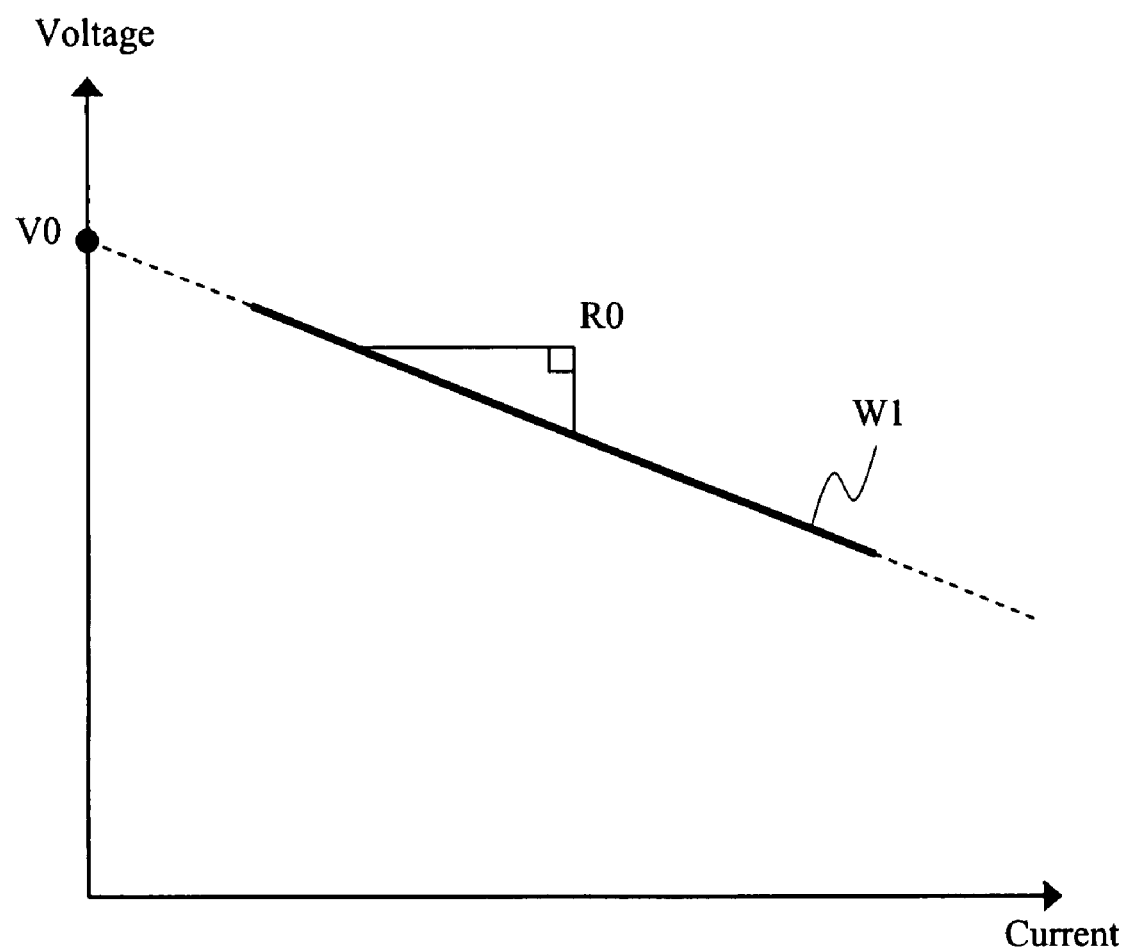
FIG. 1 is a diagram showing a current-voltage characteristic outputted from both end terminals of an antenna when the power supplied in the form of electromagnetic waves from an interrogator is received by the antenna provided in a non-contact electronic device.
Figure 2:
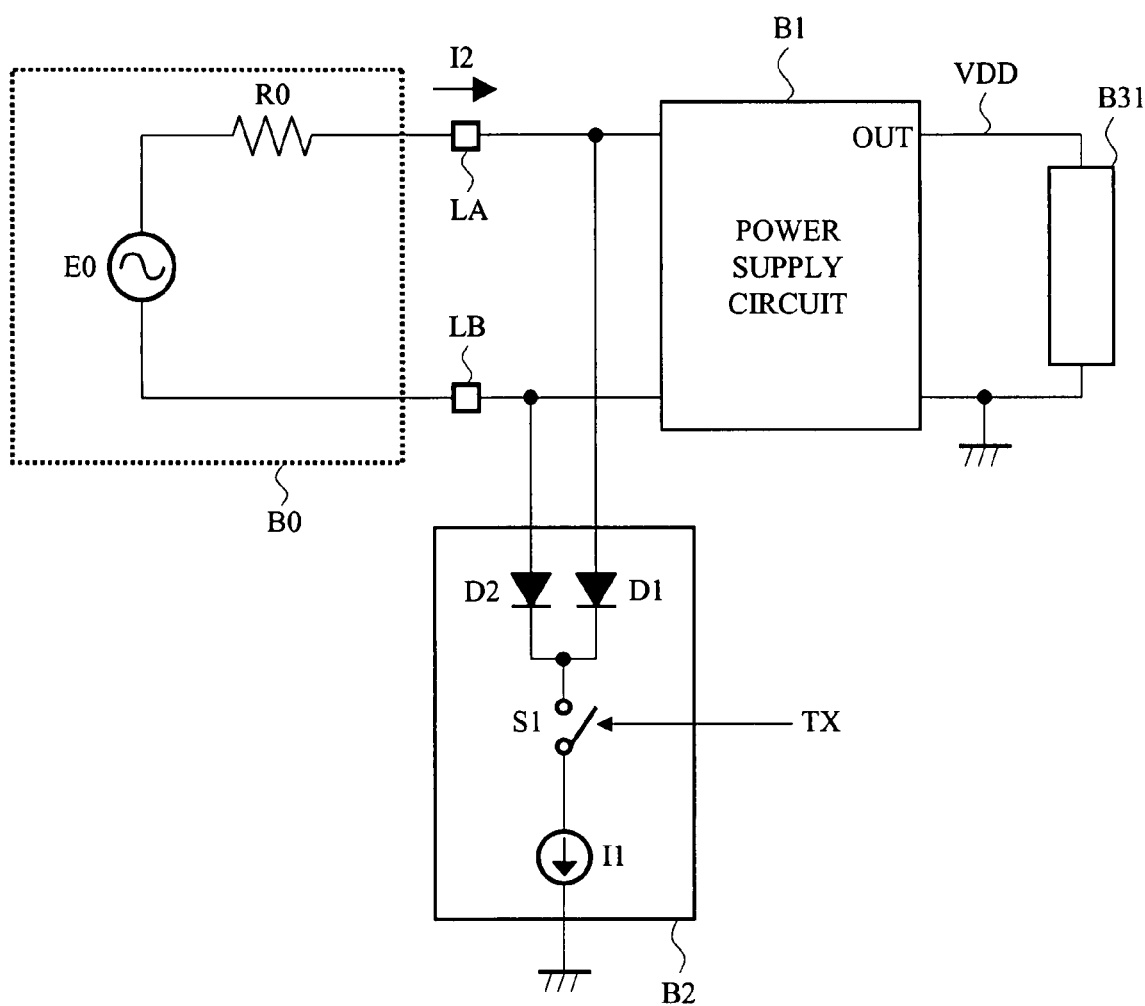
FIG. 2 is a diagram showing an equivalent circuit having the current-voltage characteristic outputted from both side terminals of the antenna of FIG. 1 and a power supply circuit and a load modulator mounted on the non-contact electronic device.

The current axis (X axis) represents the current amplitude of a current I2 flowing in the antenna terminal LA, and the voltage axis (Y axis) represents the voltage amplitude of each terminal. W7 denotes a voltage between the antenna terminals when the transmitting circuit B8 is turned off, W9 denotes a voltage between the antenna terminals when the transmitting circuit B8 is turned on, W8 denotes an output voltage of the power supply circuit B5 when the transmitting circuit B8 is turned off, and W10 denotes the output voltage of the power supply circuit B5 when the transmitting circuit B8 is turned on, respectively. Further, similar to FIG. 3, W5 and W6 denote one example of the current-voltage characteristic outputted from the both side terminals of the antenna shown in FIG. 1. W5 represents the current-voltage characteristic in the short distance communication, and W6 represents the current-voltage characteristic in the long distance communication, respectively. It can be understood that the current-voltage characteristic W6 has a larger degree of the output resistance R0 shown in FIG. 1 and FIG. 2.

Figure 3:
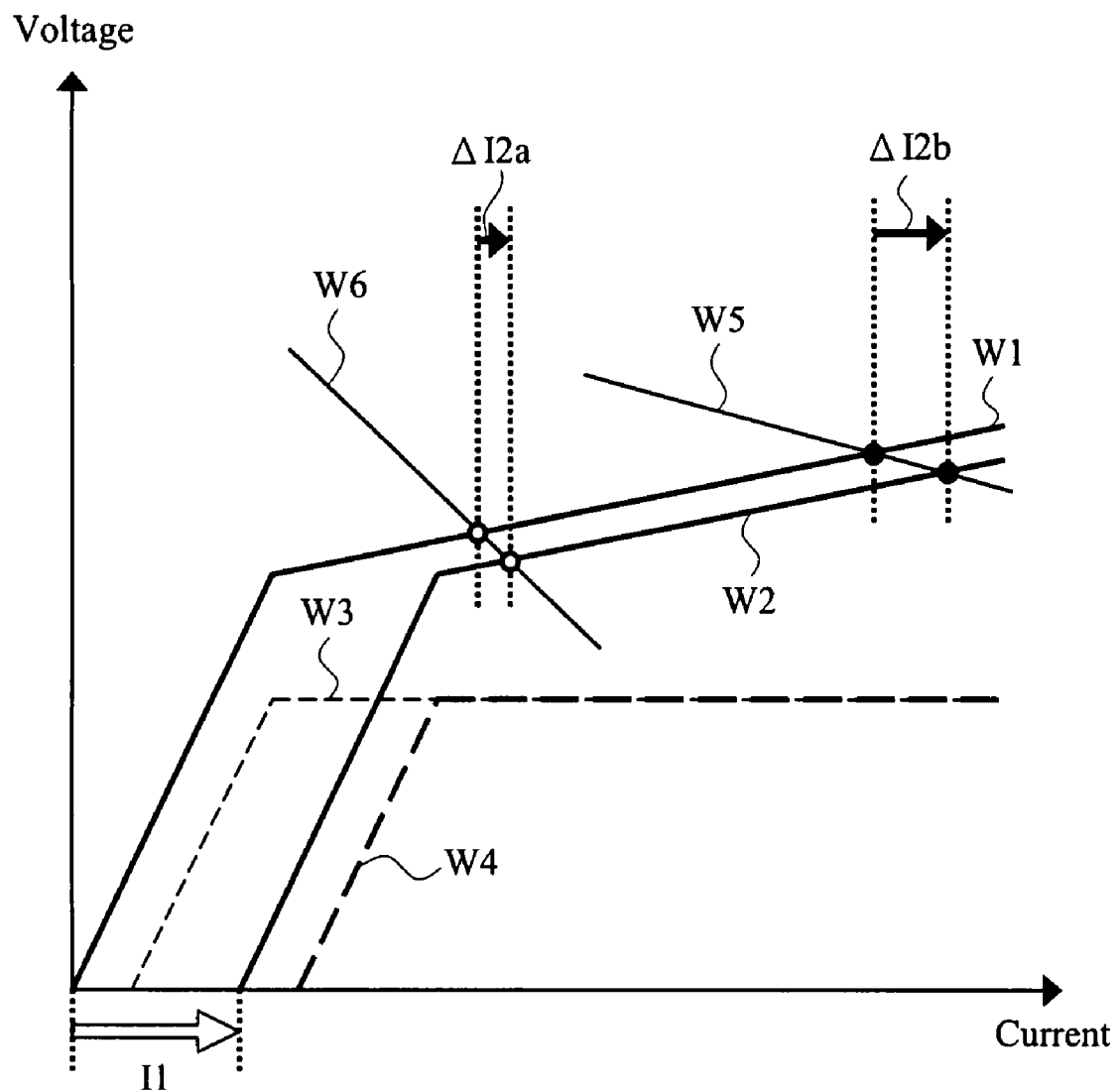
FIG. 3 is a diagram showing one example of the current-voltage characteristic of each terminal voltage in FIG. 2.

Similar to FIG. 3, a waveform of the voltage W9 between the antenna terminals when the transmitting circuit B8 is turned on can be considered to have a characteristic obtained by shifting the waveform of the voltage W7 between the antenna terminals when the transmitting circuit B8 is turned off by the output current I1 of the transmitting circuit B8 in the direction of the current axis (X axis). Further, since the intersecting points with the current-voltage characteristics W5 and W6 showing the output characteristic of the antenna become the operating points in the respective conditions, the intersecting points of the current-voltage characteristics W5 and W6 and the voltage W9 between the antenna terminals show the operating points when the transmitting circuit B8 is turned on, and the intersecting points of the current-voltage characteristics W5 and W6 and the voltage W7 between the antenna terminals show the operating points when the transmitting circuit B8 is turned off, respectively. Also, the difference in current between these two operating points becomes current changes ΔI2c and ΔI2d outputted to the antenna terminals by the turning on and off of the transmitting circuit B8.

Accordingly, since the current change ΔI2d in the current-voltage characteristic W6 which has a large slope is larger than the current change ΔI2c in the current-voltage characteristic W5 which has a small slope, when the transmitting circuit B8 is turned off and an operation is performed in the region where the slope of the voltage W7 between the antenna terminals can be approximated to half the resistor R4, the attenuation of the current change I1 generated by the transmitting circuit B8 can be suppressed. This indicates that the coefficients of the right side in the above-described formula 1 can be made large.

According to the description above, in the region where the amount of the current flowing in the antenna is small, the change of the voltage between the antenna terminals is made steep, and in the region where the amount of the current flowing in the antenna is large, the change of the voltage between the antenna terminals is made gentle. By this means, a large current change can be outputted even in the long distance communication, and the stable data transmission to the interrogator can be realized.

Although it is presumed here that the transistor sizes of the MOS transistors M3 and M5 are equal and the resistor R4 is extremely larger than the resistor R3, this is not meant to be restrictive. For example, it is possible to employ the configuration where the transistor size of the MOS transistor M5 is made extremely larger than the MOS transistor M3 and the resistor R3 is made equal to the resistor R4.

Second Embodiment

Figure 9:
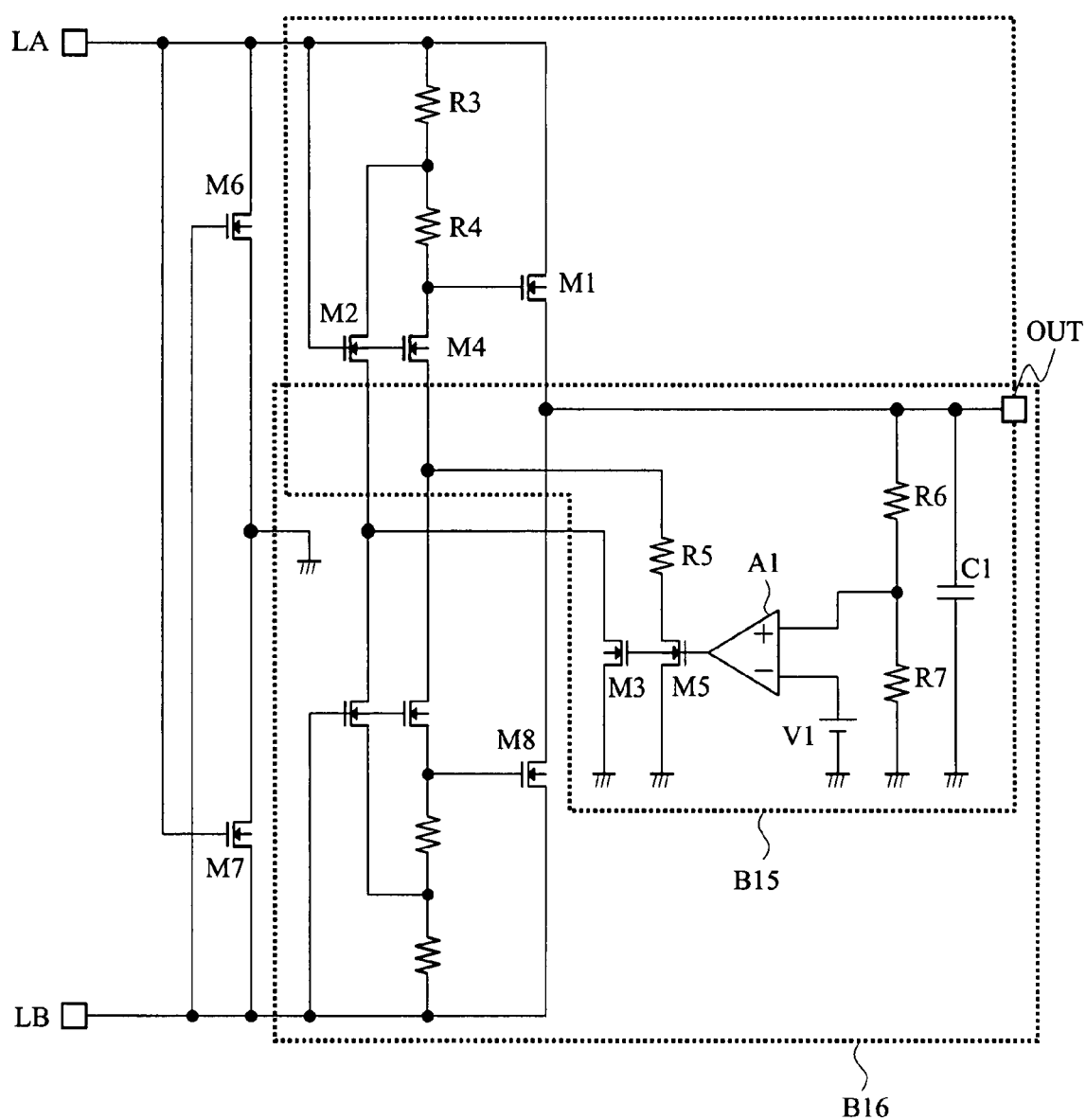
FIG. 9 is a circuit diagram showing the configuration of the power supply circuit mounted on the semiconductor integrated circuit according to a second embodiment of the present invention.

FIG. 9 is a circuit diagram showing an example of the configuration of a power supply circuit mounted on a semiconductor integrated circuit according to a second embodiment of the present invention. In the second embodiment, a modified example of the power supply circuit in the first embodiment of FIG. 6 will be described.

In the power supply circuit shown in FIG. 9, a MOS transistor M6 whose gate is connected to an antenna terminal LB and a MOS transistor M7 whose gate is connected to an antenna terminal LA are connected in series between the antenna terminals LA and LB, and a connecting point of the MOS transistors M6 and M7 serves as a ground terminal. Further, a power supply circuit B15 which is connected to the antenna terminal LA, the output terminal OUT and the ground terminal and a power supply circuit B16 which is connected to the antenna terminal LB, the output terminal OUT and the ground terminal have the same configuration as that of the power supply circuit B5 shown in FIG. 6, and MOS transistor M3 and M5, resistors R5, R6, and R7, a power supply capacitor C1, and an operational amplifier A1 are utilized in common.

In this case, a full wave rectifier in which MOS transistors M1 and M8 operate as a rectifier element (diode) of the high potential side and the MOS transistors M6 and M7 operate as a rectifier element of the low potential side is formed.

By this means, the same effect as that of the power supply circuit shown in FIG. 6 can be obtained, and at the same time, a ripple of the output voltage can be reduced because of the application of the full wave rectifier.

Third Embodiment

Figure 10:
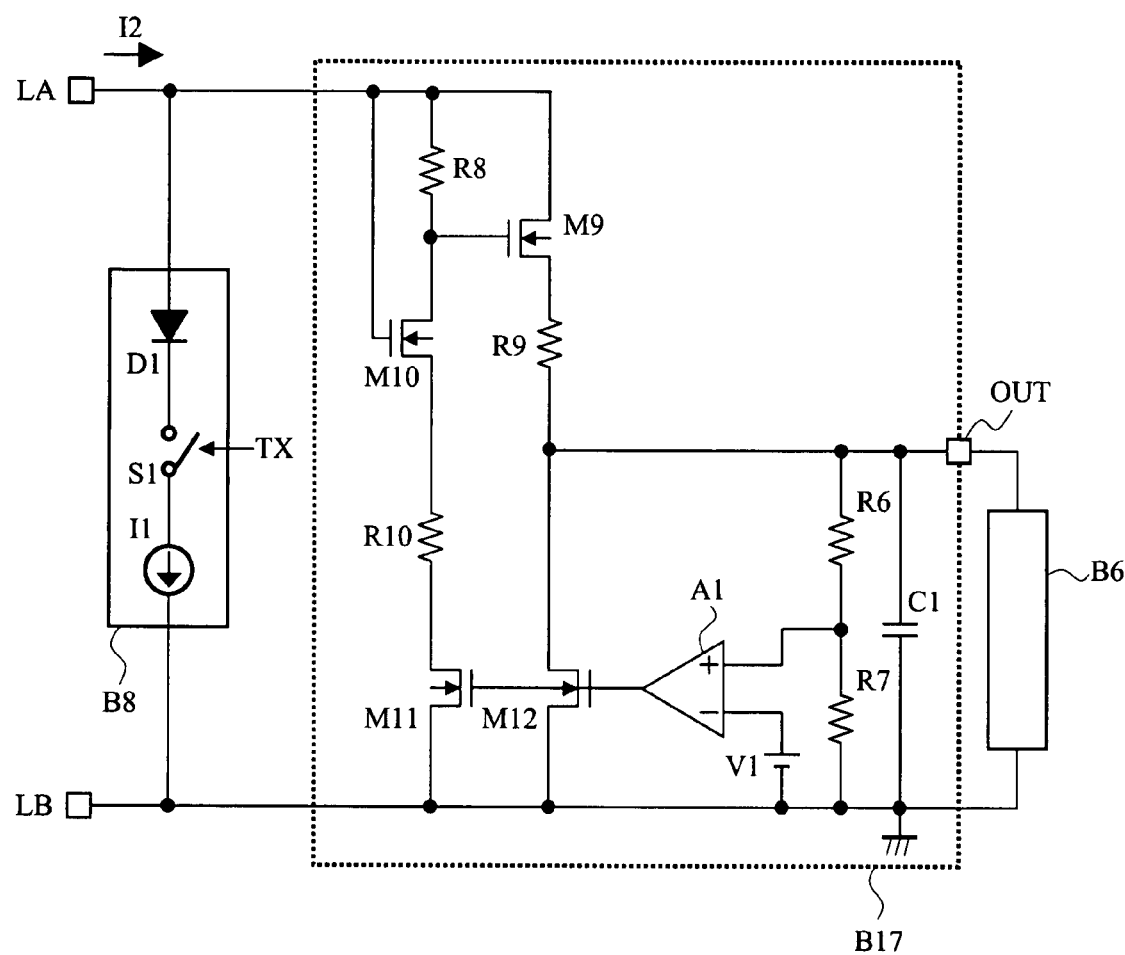
FIG. 10 is a circuit diagram showing the configuration of the power supply circuit mounted on the semiconductor integrated circuit according to a third embodiment of the present invention.

FIG. 10 is a circuit diagram showing an example of the configuration of a power supply circuit mounted on a semiconductor integrated circuit according to a third embodiment of the present invention. In the third embodiment, a modified example of the first embodiment of FIG. 6 will be described.

Similar to FIG. 6, a power supply circuit B17 has a rectifying and smoothing function and an output voltage suppression function, and an antenna mounted in a non-contact electronic device is connected to antenna terminals LA and LB. Further, the antenna terminal LB is used also as a ground terminal in a chip, and a power supply voltage VDD based on the antenna terminal LB is obtained at an output terminal OUT and is supplied to an internal circuit B6.

In the power supply circuit B17, a MOS transistor M9 having a resistor R8 connected between the gate and the drain thereof and a resistor R9 are connected between the antenna terminal LA and the output terminal OUT, a connecting point of resistors R6 and R7 connected in series between the output terminal OUT and the antenna terminal LB is connected to a non-inverting input terminal (+) of an operation amplifier circuit A1, and a reference voltage V1 is inputted to an inverting input terminal (−). Further, a MOS transistor M12 whose gate is connected to an output terminal of the operation amplifier circuit A1 is connected between the output terminal OUT and the antenna terminal LB, and a MOS transistor M10 whose gate is connected to the antennal terminal LA, a resistor R10, and a MOS transistor M11 whose gate is connected to the output terminal of the operation amplifier circuit A1 are connected in series between the gate of the MOS transistor M9 and the antenna terminal LB.

The MOS transistor M9 operates as a rectifier element which allows the current to flow to the output terminal OUT from the antenna terminal LA when the potential of the antenna terminal LA is higher than the potential of the antenna terminal LB and supplies the current to the power supply capacitor C1 connected between the output terminal OUT and the antenna terminal LB through the resistor R9. The power supply voltage VDD smoothed by the power supply capacitor C1 is supplied to the internal circuit B6.

Similar to FIG. 6, a transmitting circuit B8 is connected between the antenna terminals LA and LB. The transmitting circuit B8 is composed of a diode D1, a switch S1 controlled by a control signal TX, and a current source I1, and it changes the current flowing between the antenna terminals LA and LB based on the control signal TX.

In the power supply circuit B17 of FIG. 10, since the MOS transistor M9 operating as the rectifier element and the resistor R9 are connected in series, although there is a difference that a forward voltage of the rectifier element becomes large until the power supply voltage VDD obtained from the output terminal OUT reaches a predetermined voltage, the same operation as the power supply circuit B5 shown in FIG. 6 can be realized.

Further, since the voltage applied to the drains of the MOS transistors M11 and M12 becomes small in the power supply circuit B17, the element withstand voltage required for the MOS transistors M11 and M12 is alleviated.

Accordingly, a MOS transistor having a thin gate oxide film through which a large current can flow even with the same transistor size can be used for the MOS transistors M11 and M12. Therefore, the transistor size of the MOS transistors M11 and M12 can be reduced, and thus the chip area can be reduced.

Fourth Embodiment

Figure 11:
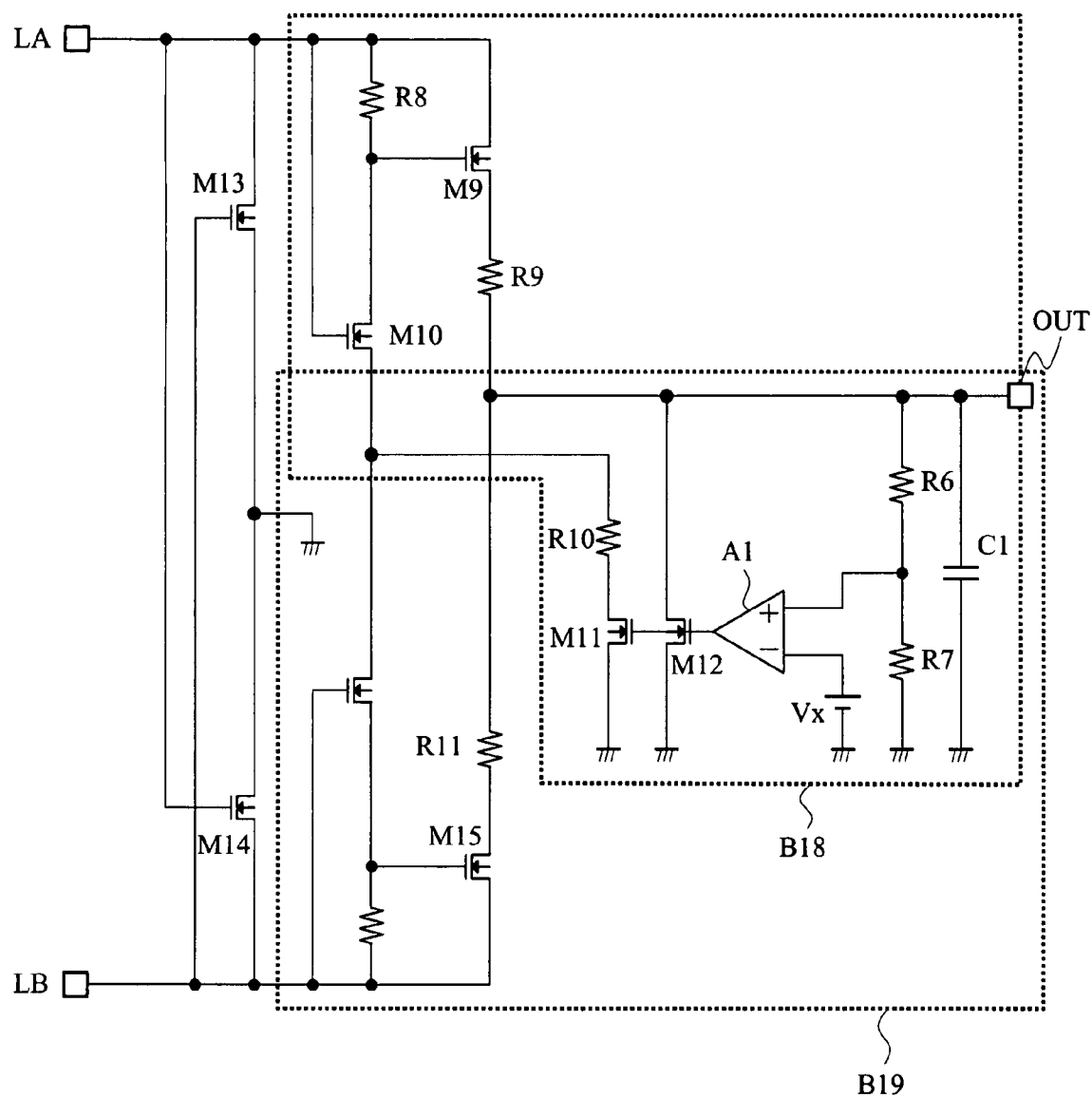
FIG. 11 is a circuit diagram showing the configuration of the power supply circuit mounted on the semiconductor integrated circuit according to a fourth embodiment of the present invention.

FIG. 11 is a circuit diagram showing an example of the configuration of a power supply circuit mounted on a semiconductor integrated circuit according to a fourth embodiment of the present invention. In the fourth embodiment, a modified example of the power supply circuit in the third embodiment of FIG. 10 will be described.

Similar to FIG. 9, a MOS transistor M13 whose gate is connected to an antenna terminal LB and a MOS transistor M14 whose gate is connected to an antenna terminal LA are connected in series between the antenna terminals LA and LB, and a connecting point of the MOS transistors M13 and M14 serves as a ground terminal. Further, a power supply circuit B18 which is connected to the antenna terminal LA, an output terminal OUT and the ground terminal and a power supply circuit B19 which is connected to the antenna terminal LB, the output terminal OUT and the ground terminal have the same configuration as that of the power supply circuit B17 shown in FIG. 10, and MOS transistors M11 and M12, resistors R6, R7, and R10, a power supply capacitor C1, and an operational amplifier A1 are utilized in common.

In this case, a full wave rectifier in which MOS transistors M9 and M15 operate as a rectifier element of the high potential side, and the MOS transistors M13 and M14 operate as a rectifier element of the low potential side is formed.

By this means, the same effect as that of the power supply circuit shown in FIG. 10 can be obtained, and at the same time, a ripple of the output voltage can be reduced because of the application of the full wave rectifier.

Fifth Embodiment

Figure 12:
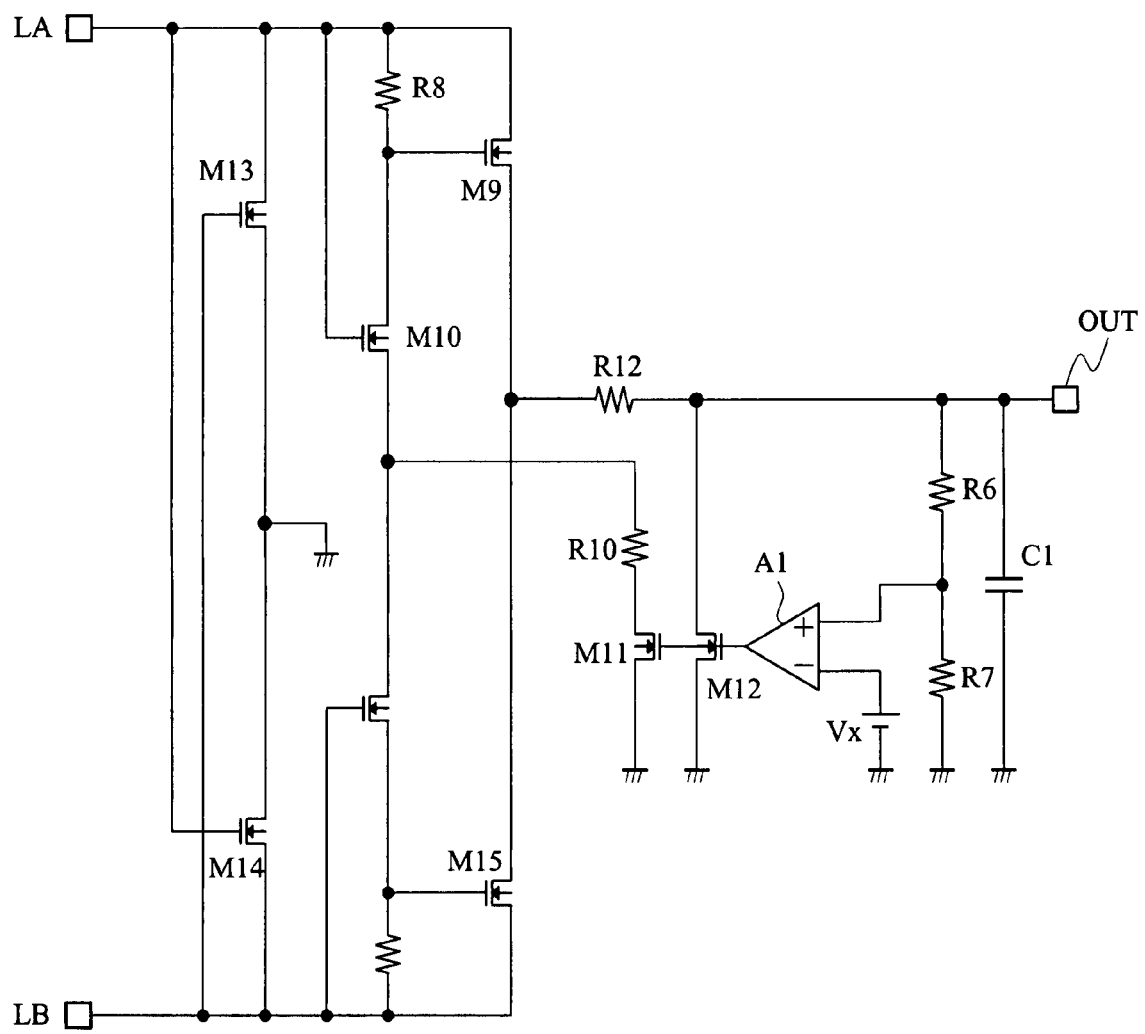
FIG. 12 is a circuit diagram showing the configuration of the power supply circuit mounted on the semiconductor integrated circuit according to a fifth embodiment of the present invention.

FIG. 12 is a circuit diagram showing an example of the configuration of a power supply circuit mounted on a semiconductor integrated circuit according to a fifth embodiment of the present invention. In the fifth embodiment, a modified example of the fourth embodiment of FIG. 11 will be described.

In the power supply circuit shown in FIG. 12, resistors R9 and R11 in the power supply circuit shown in FIG. 11 are coupled. In FIG. 11, since heavy current flows in the resistors R9 and R11, it is necessary to increase the width of the resistors when a current density is taken into account, and therefore, the occupied area of the registers on the chip is large.

If attention is paid to the resistors R9 and R11, it is only when the potential of the antenna terminal LA is higher than that of the output terminal OUT that the current flows in the resistor R9, and it is only when the potential of the antenna terminal LB is higher than the output terminal OUT that the current flows in the resistor R11. Therefore, no current flows in the resistors R9 and R11 at the same time.

Consequently, by inserting a resistor R12 obtained by coupling the function of the resistors R9 and R11 into the power supply circuit as shown in FIG. 12, the number of resistors through which a heavy current flows can be reduced to one. By this means, since the number of resistors which occupy the large area can be reduced to half, it is possible to reduce the chip area.

Sixth Embodiment

FIG. 13 is a circuit diagram showing an example of the configuration of a power supply circuit mounted on a semiconductor integrated circuit according to a sixth embodiment of the present invention. In the sixth embodiment, a power supply circuit obtained by adding a load modulation function (transmitting circuit B8) to, for example, the configuration of FIG. 9 will be described.

In the configuration of the power supply circuit shown in FIG. 13, a MOS transistor M16 is inserted between the resistor R5 and the MOS transistor M5 of the power supply circuit shown in FIG. 9. By turning on the MOS transistor M16 by a control signal TX, a state where the load modulation function is turned off is realized, and by turning off the MOS transistor M16 by the control signal TX, a state where the load modulation function is turned on is realized.

FIG. 14 shows the current-voltage characteristic of each terminal voltage when the MOS transistor M16 is turned on and off in the power supply circuit having the load modulation function shown in FIG. 13.

The current axis (X axis) represents a current amplitude of a current I2 flowing in the antenna terminals, and the voltage axis (Y axis) represents a voltage amplitude of each terminal. W7 denotes a voltage between the antenna terminals LA and LB when the MOS transistor M16 is turned on, W11 denotes a voltage between the antenna terminals LA and LB when the MOS transistor M16 is turned off, and W12 denotes a power supply voltage VDD obtained at an output terminal OUT, respectively.

Similar to FIG. 3 and FIG. 8, since intersecting points with the current-voltage characteristics W5 and W6 showing the output characteristics of the antenna are the operating points in the respective conditions, the intersecting points of the current-voltage characteristics W5 and W6 and the waveform of the voltage W7 between the antenna terminals show the operating points when the MOS transistor M16 is turned on, and the intersecting points of the current-voltage characteristics W5 and W6 and the waveform of the voltage W11 between the antenna terminals show the operating points when the MOS transistor M16 is turned off, respectively. Also, the difference in current between these two operating points becomes the current changes ΔI2e and ΔI2f outputted to the antenna terminals by the turning on and off of the MOS transistor M16.

By this means, similar to the current-voltage characteristic W6, even in the long distance communication in which the slope thereof becomes large, a large current change can be generated in the antenna terminals, and a stable data transmission to an interrogator can be realized. Further, according to this power supply circuit configuration, since a load modulation function can be realized by adding only the MOS transistor M16, the chip area can be reduced.

Although means for adding the load modulation function to the power supply circuit has been described herewith using FIG. 9 as an example, needless to mention, the means can be applied also to the circuits shown in FIG. 6 and FIG. 10 to FIG. 12.

Seventh Embodiment

FIG. 15 is a circuit diagram showing an example of the configuration of a power supply circuit mounted on a semiconductor integrated circuit according to a seventh embodiment of the present invention. In the seventh embodiment, a modified example of the resistor R5 of FIG. 6 will be described.

In the power supply circuit shown in FIG. 15, the resistor R5 in the power supply circuit shown in FIG. 6 is replaced by a current limiter B20. The current limiter B20 is composed of a current source I3 and a MOS transistor M17 whose gate and drain are connected, which are connected in series between an output terminal OUT and a ground terminal, and a MOS transistor M18 whose gate is connected to a connecting point of the current source I3 and the MOS transistor M17.

In FIG. 6, the resistor R5 is disposed so as to realize a function to control the current flowing in the MOS transistor M5. At this time, the current level at which the current flowing in the MOS transistor M5 is controlled varies depending on the threshold voltage and the temperature of the MOS transistors M1 and M4.

Here, the resistor R5 of FIG. 6 is replaced by the current limiter B20 and a current source having small temperature dependency is used for the current source I3. By this means, the same function as FIG. 6 can be realized, and at the same time, a characteristic difference can be reduced.

Although the case where the current limiter B20 is applied has been described here with using FIG. 6 as an example, needless to mention, it can also be applied to the circuits shown in FIG. 9 to FIG. 13.

The effects obtained by typical aspects of the present invention will be briefly described below.

That is, the semiconductor integrated circuit and the non-contact electronic device using the same according to the present invention comprise an antenna, a rectifier function, a load modulation function, and a regulator function, wherein the regulator function has a characteristic that the change in the voltage generated at both ends of the antenna for the current flowing in the antenna becomes large when the power supplied to the non-contact electronic device is small, and the change in the voltage generated at both ends of the antenna for the current flowing in the antenna becomes small when the power supplied to the non-contact electronic device is large. By this means, a large load modulation current can be generated in the data transmission from the non-contact electronic device to the interrogator particularly when the communication distance between the non-contact electronic device and the interrogator is long.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above-described embodiments, the power supply circuit has been composed of N-type MOS transistors. However, P-type MOS transistors may be used instead of N-type MOS transistors. Further, other than the MOS transistors, bi-polar transistors and others may be used.

The present invention is preferably applied to non-contact electronic devices such as an IC card and an IC tag.

What is claimed is:

1. A semiconductor integrated circuit, comprising:
   first and second antenna terminals for connection to an antenna;
   a power supply circuit for performing rectification of signals between the first and second antenna terminals and voltage control; and
   a load modulator for performing modulation of the signals between the first and second antenna terminals,
   wherein, in a current-voltage characteristic between the first and second antenna terminals in a region where an output voltage of the power supply circuit reaches a predetermined voltage and a voltage suppression operation works, a voltage change slope in a first current region is larger than a voltage change slope in a second current region having a higher current that of the first current region,
   wherein the power supply circuit has a first voltage controlled circuit and a first voltage detector,
   wherein the first voltage controlled circuit is provided with a first input terminal and a first output terminal,
   wherein between the first input terminal and the first output terminal, a first MOS transistor having a first resistor and a second resistor connected in series between a gate and a drain thereof is connected,
   wherein between a connecting point of the first resistor and the second resistor and a ground terminal, a second MOS transistor whose gate is connected to the first input terminal and a third MOS transistor are connected in series,
   wherein between the gate of the first MOS transistor and the ground terminal, a fourth MOS transistor whose gate is connected to the first input terminal, a current limiter, and a fifth MOS transistor are connected in series,
   wherein the gates of the third MOS transistor and the fifth MOS transistor are connected to an output terminal of the first voltage detector,
   wherein the current limiter controls current flowing between a drain and a source of the fifth MOS transistor, thereby controlling voltage which can be generated in the second resistor,
   wherein a first input terminal of the first voltage controlled circuit is connected to the first antenna terminal,
   wherein a first output terminal of the first voltage controlled circuit is connected to a power supply terminal, and
   wherein the first voltage detector outputs a voltage corresponding to a power supply voltage generated between the power supply terminal and the ground terminal.

2. The semiconductor integrated circuit according to claim 1,
   wherein the first MOS transistor is configured as a first rectifying element,
   wherein the power supply circuit further comprises a second voltage controlled circuit and a second rectifier element,
   wherein the second voltage controlled circuit is provided with a second input terminal and a second output terminal,
   wherein the second input terminal of the second voltage controlled circuit is connected to the second antenna terminal,
   wherein the second output terminal of the second voltage controlled circuit is connected to the power supply terminal,
   wherein the first rectifier element is connected between the first antenna terminal and the ground terminal, and
   wherein the second rectifier element is connected between the second antenna terminal and the ground terminal.

3. The semiconductor integrated circuit according to claim 1,
   wherein the current limiter is a fifth resistor.

4. The semiconductor integrated circuit according to claim 1,
   wherein the current limiter comprises a fifth resistor and a tenth MOS transistor connected in series, and
   the tenth MOS transistor serves also as the load modulator.

5. The semiconductor integrated circuit according to claim 1,
   wherein a resistance value of the second resistor is larger than a resistance value of the first resistor.

6. A semiconductor integrated circuit, comprising:
   first and second antenna terminals to which an antenna is connected;
   a power supply circuit for performing rectification of signals between the first and second antenna terminals and voltage control; and
   a load modulator for performing modulation of the signals between the first and second antenna terminals,
   wherein, in a current-voltage characteristic between the first and second antenna terminals in a region where an output voltage of the power supply circuit reaches a predetermined voltage and a voltage suppression operation works, a voltage change slope in a first current region is larger than a voltage change slope in a second current region having a higher current than that of the first current region, wherein the power supply circuit comprises a third voltage controlled circuit and a first voltage detector, wherein the third voltage controlled circuit is provided with a third input terminal and a third output terminal, wherein between the third input terminal and the third output terminal, a sixth MOS transistor having a third resistor connected between a gate and a drain thereof and a fourth resistor are connected in series, wherein between the third output terminal and the ground terminal, a seventh MOS transistor is connected, wherein between the gate of the sixth MOS transistor and the ground terminal, an eight MOS transistor whose gate is connected to the third input terminal, a current limiter, and a ninth MOS transistor are connected in series, wherein the seventh MOS transistor and the ninth MOS transistor are connected to an output terminal of the first voltage detector, wherein the third input terminal of the third voltage controlled circuit is connected to the first antenna terminal, wherein the third output terminal of the third voltage controlled circuit is connected to a power supply terminal, wherein the current limiter controls a current flowing between a drain and a source of the ninth MOS transistor, thereby controlling a voltage which can be generated in the third resistor, and wherein the first voltage detector outputs a voltage corresponding to a power supply voltage generated between the power supply terminal and the ground terminal.

7. The semiconductor integrated circuit according to claim 6, wherein the sixth MOS transistor is configured as a first rectifying element, wherein the power supply circuit further comprises a fourth voltage controlled circuit and a second rectifier element, wherein the fourth voltage controlled circuit is provided with a fourth input terminal and a fourth output terminal, wherein the fourth input terminal of the fourth voltage controlled circuit is connected to the second antenna terminal, wherein the fourth output terminal of the fourth voltage controlled circuit is connected to the power supply terminal, wherein, between the first antenna terminal and the ground terminal, the first rectifier element is connected, and wherein, between the second antenna terminal and the ground terminal, the second rectifier element is connected.

8. The semiconductor integrated circuit according to claim 6, wherein the current limiter is a fifth resistor.

9. The semiconductor integrated circuit according to claim 6, wherein the current limiter comprises a fifth resistor and a tenth MOS transistor connected in series, and the tenth MOS transistor serves also as the load modulator.

10. A non-contact electronic device, comprising:

the semiconductor integrated circuit according to claim 1; and an antenna connected to the first and second antenna terminals.

11. A semiconductor integrated circuit, comprising:

first and second antenna terminals to which an antenna is connected;

a power supply circuit for performing rectification of signals between the first and second antenna terminals and voltage control; and a load modulator for performing modulation of the signals between the first and second antenna terminals, wherein the power supply circuit is made up of a first voltage controlled circuit and a first voltage detector, wherein the first voltage controlled circuit is provided with an input terminal and an output terminal, wherein a first MOS transistor having a first resistor connected between a gate terminal and a drain terminal is connected between the input terminal and the output terminal, wherein a second MOS transistor is connected between the output terminal and a ground terminal, wherein between a gate terminal of the first MOS transistor and the ground terminal, a third MOS transistor whose gate terminal is connected to the drain terminal of the first MOS transistor, a current limiter, and a fourth MOS transistor are connected in series, wherein a gate terminal of the second MOS transistor and a gate terminal of the fourth MOS transistor are connected to an output terminal of the first voltage detector, wherein the input terminal of the first voltage controlled circuit is connected to the first antenna terminal, wherein a second resistor is connected between the input terminal of the first voltage controlled circuit and a power supply terminal, wherein the current limiter controls current flowing between a drain terminal and a source terminal of the fourth MOS transistor, thereby controlling voltage which can be generated in the first resistor, and wherein the first voltage detector outputs a voltage corresponding to a power supply voltage generated between the power supply terminal and the ground terminal.

12. The semiconductor integrated circuit according to claim 11, wherein the power supply circuit further comprises a second voltage controlled circuit, a first rectifier element, and a second rectifier element, wherein the second voltage controlled circuit is provided with an input terminal and an output terminal, wherein the input terminal of the second voltage controlled circuit is connected to the second antenna terminal, wherein the output terminal of the second voltage controlled circuit is connected to the output terminal of the first voltage controlled circuit, wherein the first rectifier element is connected between the first antenna terminal and the ground terminal, and wherein the second rectifier element is connected between the second antenna terminal and the ground terminal.

13. The semiconductor integrated circuit according to claim 1, wherein the current limiter is a third resistor.

14. The semiconductor integrated circuit according to claim 1, wherein the current limiter is made up of a third resistor and a fifth MOS transistor connected in series, and wherein the fifth MOS transistor also serves as the load modulator.

* * * * *